(12) United States Patent
Kim et al.

(10) Patent No.: US 7,698,467 B2
(45) Date of Patent: Apr. 13, 2010

(54) METHOD FOR TRANSFORMING CONTENTS IN THE DLNA SYSTEM

(75) Inventors: Chul Seung Kim, Seoul (KR); Ho Chul Shin, Suwon-si (KR); Young Kyu Bae, Suwon-si (KR); Yun Je Oh, Yongin-si (KR); Joon Oo Kim, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 536 days.

(21) Appl. No.: 11/487,770

(22) Filed: Jul. 17, 2006

(65) Prior Publication Data
US 2007/0237090 A1 Oct. 11, 2007

(30) Foreign Application Priority Data
Apr. 10, 2006 (KR) .................. 10-2006-0032192

(51) Int. Cl.
*G06F 15/16* (2006.01)
(52) U.S. Cl. .................. 709/246; 709/227; 709/220; 709/224
(58) Field of Classification Search .................. 709/246, 709/247, 227, 220, 223, 224
See application file for complete search history.

(56) References Cited

U.S. PATENT DOCUMENTS

| 7,085,814 B1* | 8/2006 | Gandhi et al. ............ 709/208 |
| 2001/0047517 A1* | 11/2001 | Christopoulos et al. ...... 725/87 |
| 2002/0147847 A1* | 10/2002 | Brewster et al. ............ 709/246 |
| 2004/0098463 A1 | 5/2004 | Shen et al. |
| 2005/0132264 A1* | 6/2005 | Joshi et al. .................. 709/231 |
| 2006/0133391 A1* | 6/2006 | Kang et al. .................. 370/401 |
| 2007/0101024 A1* | 5/2007 | Doumuki et al. ............ 709/246 |

FOREIGN PATENT DOCUMENTS

| JP | 2005-45510 | 2/2005 |
| KR | 2003-62732 | 7/2003 |
| KR | 2005-16639 | 2/2005 |
| KR | 2005-106393 | 11/2005 |
| WO | WO 01/59706 | 8/2001 |

* cited by examiner

*Primary Examiner*—Philip B Tran
(74) *Attorney, Agent, or Firm*—Cha & Reiter, LLC

(57) ABSTRACT

A Digital Living Network Alliance (DLNA) system and method transform multimedia contents in a manner adaptive to the available data processing capability of the digital media renderer (DMR) of the DLNA network. A digital media server (DMS) and a digital media renderer (DMR) are discovered. A list of contents provided by the DMS is obtained. Information on a transport protocol and a data format of the DMR is obtained. Information on available data processing capability of the DMR is obtained. The transport protocol and the data format of the DMS are matched to those of the DMR. Transcoding and transrating schemes of the DMS are adjusted based on the available data processing capability of the DMR. A connection between the DMS and the DMR is established, and content stored in the DMS is transmitted to the DMR.

20 Claims, 4 Drawing Sheets

METHOD FOR TRANSFORMING CONTENTS IN THE DLNA SYSTEM

CLAIM OF PRIORITY

Priority is claimed under 35 U.S.C. § 119 from Korean Patent Application No. 2006-0032192, which was filed in the Korean Intellectual Property Office on Apr. 10, 2006, the contents of which are herein incorporated by reference in their entirety.

BACKGROUND OF THE INVENTION

1. Field of the Invention

The present invention relates to a Digital Living Network Alliance (DLNA) system and, in particular, to a method for transforming multimedia contents adaptive to the available data processing capability of the digital media renderer (DMR) of the DLNA network.

2. Description of the Related Art

The Digital Living Network Alliance (DLNA) is an alliance of leading companies, including Microsoft (MS), International Business Machines (IBM), Hewlett-Packard (HP), Intel, Sony, Matsushita, Samsung, etc. in the consumer electronics, mobile, and personal computer industries. An aim of the alliance is to create industry standards that will allow products from all companies to be compatible with each other and to enable a network of electronic devices in the home.

Home networking technologies are now rapidly developing such that consumer electronics, mobile and PC devices are interoperating in a home to enhance and enrich user experiences with various services.

The DLNA defines a PC Internet Network wherein PC and PC peripherals such as a printer communicate. A mobile network of multimedia mobile phones, personal digital assistants (PDAs), Motion Pictures Expert Group (MPEG) 1 Audio Layer 3 (MP3) players, laptop computers, and similar devices provide unparalleled connectivity and freedom of movement into and out of the home environment. A consumer electronics (CE) network includes set-top boxes and traditional consumer electronics.

To deliver interoperability in the digital home, the DLNA has focused on 1) industry collaboration, 2) standards-based interoperability, and 3) compelling products, and has developed the physical media, network transports, media formats, streaming protocols and digital rights management (DRM) on the basis of Universal Plug and Play (UPnP).

FIG. 1 is a block diagram illustrating a conventional DLNA system 100. As shown FIG. 1, the DLNA system 100 is implemented with a plurality of DLNA networks 101. Each includes a Digital Media Server (DMS) 103, a Digital Media Player (DMP) 105, a Digital Media Controller (DMC) 106, and a Digital Media Renderer (DMR) 107.

The DMS 103, DMP 105, and DMC 106 can be a Mobile-Digital Media Server (M-DMP), Mobile-Digital Media Player (M-DMP), and Mobile-Digital Controller (M-DMC), respectively. The M-DMS, M-DMP, and M-DMC can access the DLNA system 100 directly or through an Access Point (AP) 109. The AP is provided with a Mobile Network Connection Function (M-NCF) as the intermediate node for bridging the M-DMS and M-DMP.

The DLNA can be implemented as a home network on the basis of a wired network standard (IEEE 802.3) or a wireless network standard (IEEE 802.11).

The DMS 103, DMP 105, and DMR 107 are interconnected so as to form a wired (IEEE. 802.3) or a wireless network (IEEE 802.11). The digital appliances on the home network can exchange multimedia data such as video and audio data on the basis of IEEE 1394 standard.

The DLNA guidelines, e.g., Home Networked Device Interoperability Guidelines v1.5, are a standard for interconnection of home network appliances. The guidelines classify the DLNA devices into DMS, DMP, DMC, and DMR and define the conditions for connections between the DMS, DMP, DMC, and DMR.

DMS functions as a Media Server Device (MSD) of UPnP AV part, which provides media contents. The main object of the DMS is to enable the control point (CP) as a user interface (UI) application to retrieve digital media content items in the DMS such that the user can display or distribute the contents. The DMS is equipped with a broadcast signal receiver and middleware for broadcast. Some example of DMS includes Video Cassette Recorders (VCRs), Compact Disc (CD) players, Digital Video Disk (DVD) players, Motion Pictures Expert Group 1 (MPEG-1) layer 3 (MP3) players, set-top boxes (STBs), TV tuners, radio tuners, and personal computers (PCs).

The DMR plays content received after being setup by another entity. Some examples of DMR devices include a TV, an audio/video receiver, a video monitor, and remote speakers for music.

The DMP is a DMR or M-DMR including the CP and therefore finds content exposed by the DMS to provide playback and rendering capabilities.

The DLNA guidelines are not a new protocol, but are created by combining the published standards and common protocols. That is, the DLNA adopts IEEE 802.3 for wired communication and IEEE 802.11 for wireless communication as the physical layer. The wired Ethernet has already proved stable, and the use of wireless Ethernet, i.e., Wi-Fi for wireless home networking has become widespread.

DLNA is also implemented with the transmission control protocol/Internet protocol (TCP/IP) for network layer. TCP/IP is a basic network communication protocol used for the elements operating on the Internet and supports transparent data exchange for the application programs operated with various media. For example, PCs or STBs can transmit media contents to the TV located in the other room via an IEEE 802.11 AP which is connected through Ethernet cable. In short, DLNA devices can communicate with each other using TCP/IP through the Internet.

DLNA is, in addition, implemented on the basis of UPnP AV architecture, and on the basis of UPnP Device architecture which is used for locating and controlling devices across the DLNA network, i.e., automatically configuring the IP address and recognizing other devices on the network with reference to the IP address, as well as checking and managing services to be provided.

DLNA further features use of the hypertext transfer protocol (HTTP) for exchanging control messages and transporting files, the extensible markup language (XML) for text message, MPEG2 for video data format, and (Joint Photographic Experts Group) JPEG for still image data format.

One of the key technologies of the DLNA guidelines is UPnP. DMSs and DMPs are addressed and automatically recognized on the basis of the protocol specified in the UPnP device architecture. For example, the DMS providing a list of stored files and broadcasting the data is the UPnP Media Server.

The DLNA guidelines are based on the UPnP and specify the design architecture of digital information products in terms of products such as household appliances, PCs, and wireless devices sharing media content over the wired or wireless home network.

The DLNA guidelines aim for the interoperability among devices, so that systems and products can operate without burdening the user in connection with their operation. The need for interoperability is growing tremendously, and looms as an important factor in deciding the quality of the information devices. This is expressed in ever-growing realization that "The network is a computer."

When media content is shared by different devices in the DLNA system 100, they transcode/transrate in achieving interoperability. In the conventional DLNA system 100, however, the Media Interoperability Unit (MIU) of the DMS performs a transcoding or transrating scheme fixedly set by the manufacturer or developer of the devices. It is therefore infeasible to check the available capabilities of the devices (for example, DMP or DMR), which complicates optimizing the transcoding or transrating to the available processing capabilities of the devices. Assuring a given quality of service (QoS) of the media contents transmitted from the DMS to the DMR consequently becomes unreliable.

SUMMARY OF THE INVENTION

The present invention has been made in an effort to solve the above problems, and, in one aspect, provides a method for transforming contents. The method serves to improve reliability in assuring QoS by optimizing the transcoding/transrating to the available capability of the devices on the UPnP-based DLNA system.

In one aspect of the present invention, the above and other aspects can be accomplished by a data-transforming method for a universal plug and play (UPnP)-based digital living network association (DLNA) system. The method includes discovering digital media server (DMS) and digital media renderer (DMR) in the DLNA system. A list of contents is provided by the DMS. Information is obtained on a transport protocol and a data format of the DMR. Information is likewise obtained on available data processing capability of the DMR. The transport protocol and the data format of the DMS are matched to the transport protocol and the data formation of the DMR. Transcoding and transrating schemes of the DMS are adjusted on the basis of the available data processing capability of the DMR. A connection can then be established between the DMS and the DMR for transmitting content stored in the DMS to the DMR.

Preferably, the available data processing capability of DMR includes digital signal processing capability of the DMR, central processing unit (CPU) value, memory value, graphic processing unit (GPU) value, and resolution.

In another aspect, a data transforming method for a home network connects at least one server and at least two clients in wired or wireless links. In the method, the server and client are discover. A list is obtained of multimedia contents items provided by the server. System information is obtained from the client. Transport protocols and the data formats between the server and the client are matched on the basis of the system information. Transcoding and transrating schemes between the server and the client are decided on the basis of the system information. The multimedia contents items are transformed in accordance with the transcoding and transrating schemes, and transmitted from the server to the client.

Preferably, the system information includes transport protocols and data formats supported by the client.

Preferably, the system information includes an available capability, such as a processing speed or unused buffer space, of the client.

Preferably, the transcoding and transrating schemes are decided on the basis of the availability of the client.

Preferably, the transrating scheme has a transrating capability less than or equal to the available capability of the client.

Preferably, the step of discovering the server and client includes selecting a client when more than two clients are discovered.

Preferably, the step of transforming the multimedia contents items includes determining whether or not there is an input command for selecting at least one of the multimedia contents items, and further includes transcoding and transforming the selected multimedia contents items if there is the input command.

Preferably, transmitting the transformed multimedia contents items includes determining whether or not there is an input command for selecting at least one of the multimedia contents items, and transmitting the selected multimedia item(s) if there is the input command.

BRIEF DESCRIPTION OF THE DRAWINGS

Details of the novel home networking data storage technology are set forth below with the aid of the following drawings, wherein.

DETAILED DESCRIPTION

Detailed discussion of well-known functions and structures incorporated herein is omitted from the following description for conciseness and clarity of presentation.

Figure 1:
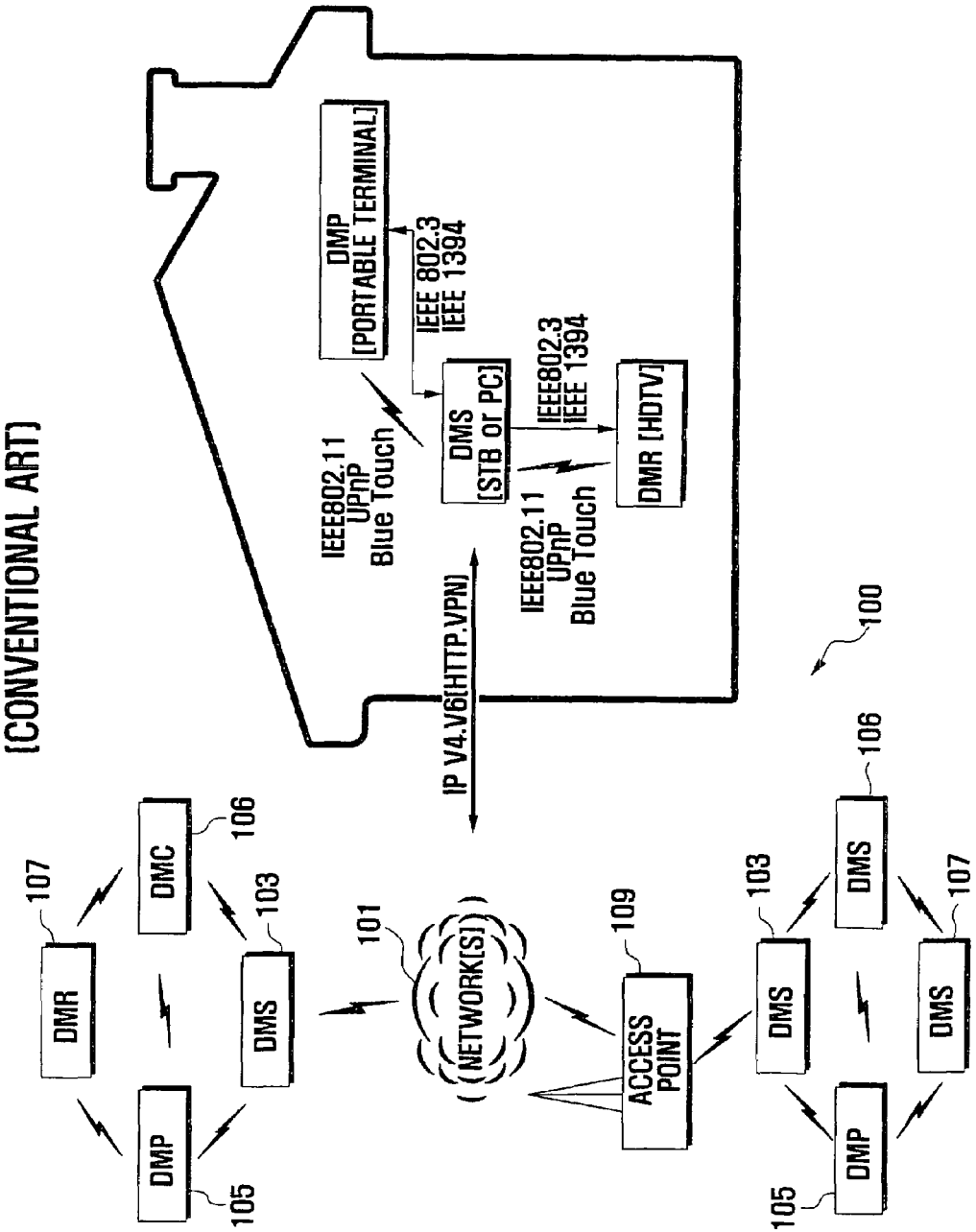
FIG. 1 is a block diagram illustrating a conventional DLNA system.
Figure 2:
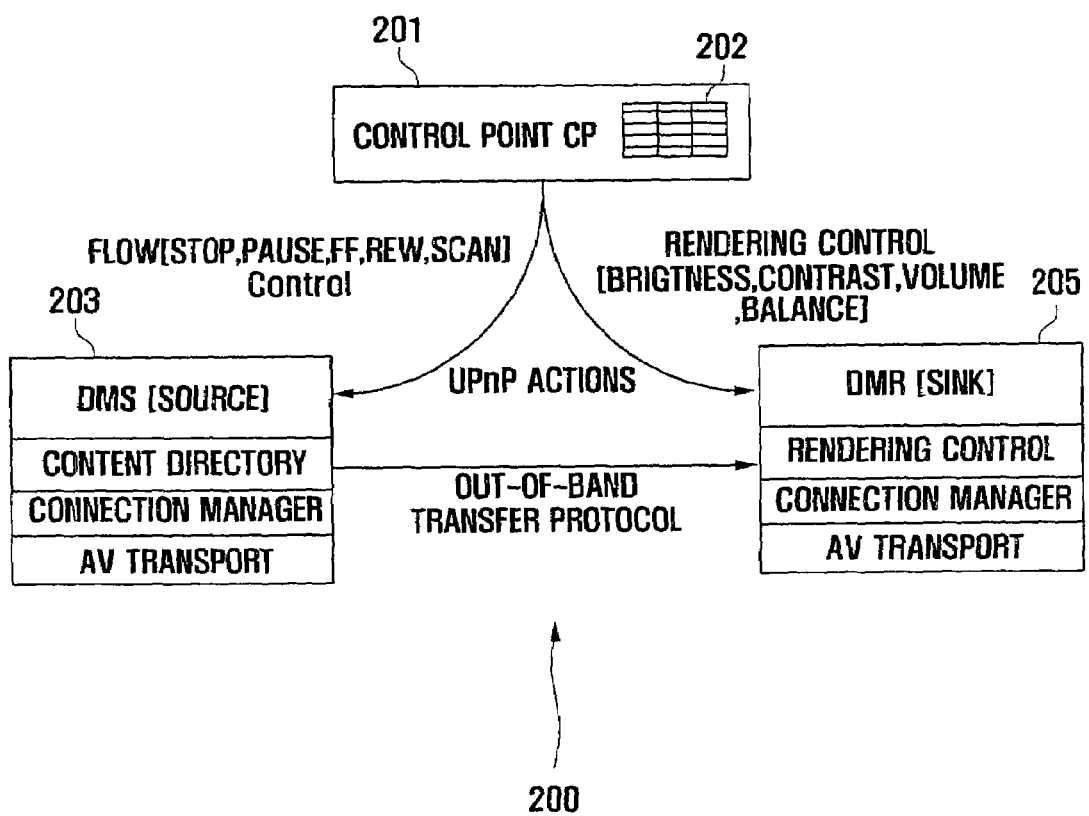
FIG. 2 is a conceptual view illustrating a DLNA system according to an embodiment of the present invention.

FIG. 2 conceptually depicts an example of a DLNA system 200 according to an embodiment of the present invention. The DLNA system 200 includes a DMS 203 for providing contents, and a DMR 205 for replaying the contents. The DLNA system 200 also includes a CP 201, which features a user interface on which to select contents and the ability to transmit the selected content from the DMS 203 to the selected DMR 205.

The CP 201 is a controller for detecting devices on the DLNA system 200 and controlling the detected devices. The CP 201 has a table 202 that stores the data formats of the contents, the transmission protocols, etc.

The CP 201 can be, for example, a TV that controls the UPnP device. The DMS 203 can be a UPnP device having storage media such as PC and VCR, and the DMR 205 can be device such as a laptop computer or an audio player.

Operationally, once the user selects one of the content items provided by the DMS 203 and a target DMR 205, the selected item is directly transmitted to the target DMR using an Out-of-Band transfer protocol.

The DMS 203 provides at least one transfer protocol and at least one data format of the respective content items. The format of the content item can be transformed into another format before being transmitted by the DMS 203. The DMR 205 can receive the content using the transfer protocol and in the data format the DMR itself supports. Also, the CP 201 controls the operation of the DMS 203 and the DMR 205 according to the user's commands.

Figure 3:
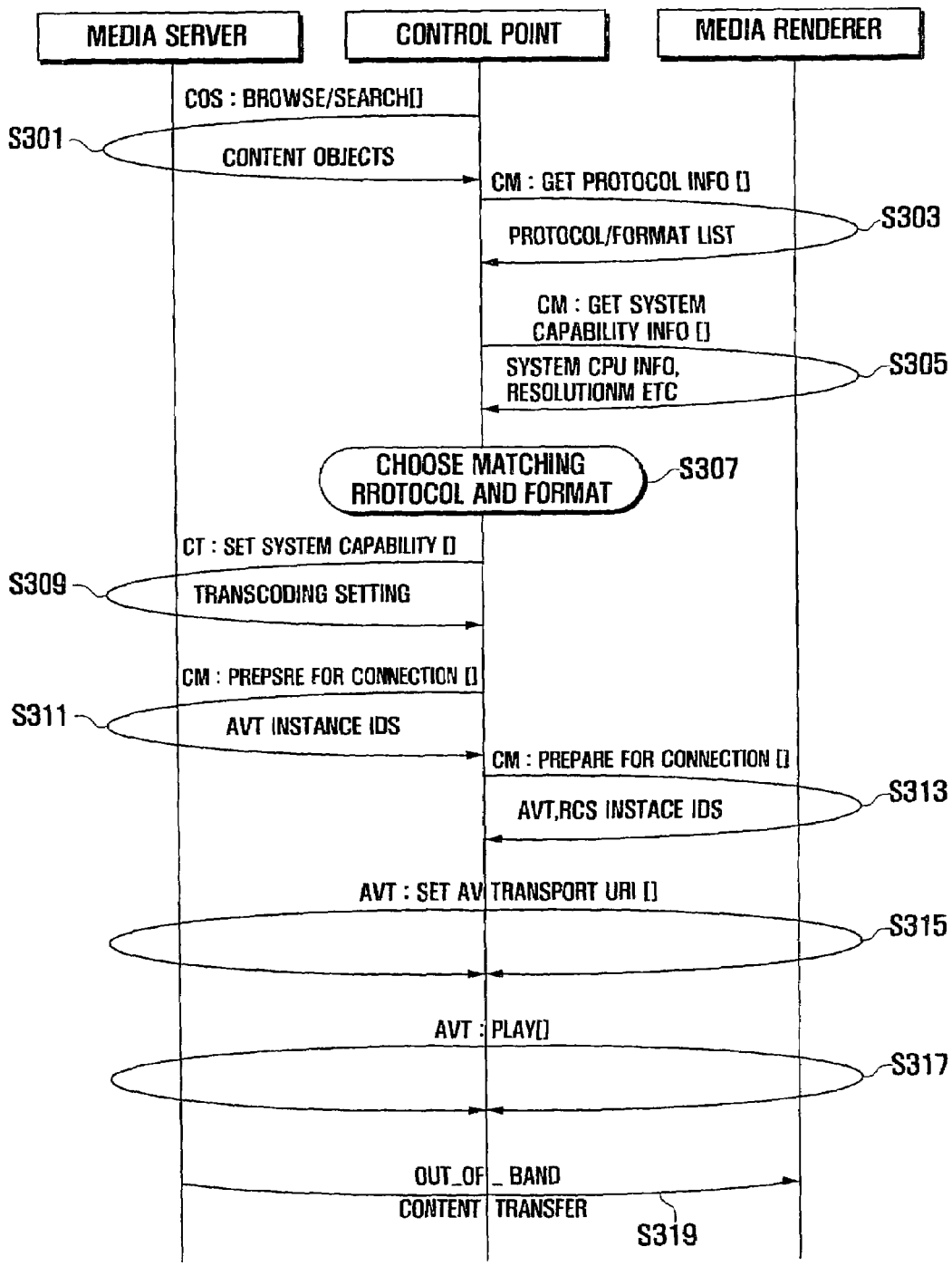
FIG. 3 is a message flow diagram illustrating operations for transmitting contents from the DMS to the DMR under the control of the CP in the DLNA system according to an embodiment of the present invention.

FIG. 3 shows, by way of illustrative and non-limitative example, operations for transmitting contents from the DMS 203 to the DMR 205 under the control of the CP 201 in the DLNA system 200 according to an embodiment of the present invention.

In this embodiment, it is assumed, for purposes of illustration, that it is desired to watch video content stored on DMS 203 (for example, a camcorder) through the DMR 205.

The CP 201 calls the DMS 203 using the CDS::Browse/ Search( ) function (i.e., a Content Directory Service function under UPnP/AV) to obtain and display contents items provided by the DMS 203 (S301). The CP 201 then calls the DMR 205 using the CM::GetProtocolInfo( ) function (i.e., a function of the Connection Manager service under UPnP/AV) to obtain information on the protocols and data formats supported by the DMR selected by the user (S303). The CP 201 also obtains, in accordance with the present invention, information on the available capability of the DMR 205 by transmitting a herein-proposed CM::GetSystemCapabilityInfo( ) function (S305).

The available capability information preferably includes digital signal processing capability, CPU usage, memory usage, graphic processing unit (GPU) usage, and resolution of the DMR 205.

The available capability can be represented by the following Table 1, which preferably resides in the memory 202. The "Name" indicates the action or function. "Optional" means that the function should be, but is not required to be, implemented at the DLNA device, e.g., DMS, DMP, DMC or DMR. "Required" means that the function is required in the DLNA device.

TABLE 1

| Name | Req or Opt |
|---|---|
| GetSystemCapabilityInfo | Opt |

The "GetSystemCapabilityInfo" can be defined by table 2. The argument of the GetSystemCapabilityInfo function is GetSystemCapabilityInfo. The "Direction" is "OUT," which indicates that the argument is an output argument. The data type is "String." As the "Description" entry in Table 2 shows, the DMS 203 checks the capability of the DMR 205, and is informed of the capability by means of the output argument returned.

TABLE 2

| Argument(s) | Direction | Type | Description | RelatedStateVariable |
|---|---|---|---|---|
| GetSystemCapabilityInfo | OUT | String | DMS Checks Capability information of the DMR | SystemCapabilityinfo |

The "SystemCapabilityInfo" is a state variable and is defined as table 3.

TABLE 3

| Variable Name | Req or Opt | Data type | Allowed Value | Default Value |
|---|---|---|---|---|
| SystemCapabilityInfo | Opt | String | String | — |

The CP 201, based on the returned output argument (S305), transmits the information on the available capacity of the DMR 205 to the DMS 203.

The CP 201 matches the transmission protocol and data format of the DMR 205 to those of the DMS 203 (S307).

In particular, the DMS 203 determines the transcoding and transrating scheme of the DMS and DMR in accordance with the SetSystemCapability( ) function of the CP 201.

If the transrating of the DMS 203 exceeds the data processing capability of the DMR 205, a media interoperability unit (MIU) of the DMS adjusts its transrating to below, i.e., within, that data processing capability.

The decision of the transcoding scheme and the transrating capability on the basis of the available data processing capability of the DMR 205 is performed by the "SetSystemCapabilityInfo" action (S309) as exemplified in the following Table 4.

TABLE 4

| Name | Req or Opt |
|---|---|
| SetSystemCapabilityInfo | Opt |

The "SetSystemCapability" is defined as follows in Table 5.

TABLE 5

| Argument(s) | Direction | Type | Description | RelatedStateVariable |
|---|---|---|---|---|
| SetSystemCapabilityInfo | IN | String | DMS stores the capability information on DMR | SystemCapabilityInfo |

"SystemCapabilityInfo" is a state variable and defined as follows in Table 6.

TABLE 6

| Variable Name | Req or Opt | Data type | Allowed Value | Default Value |
|---|---|---|---|---|
| SystemCapabilityInfo | Opt | String | String | — |

"SystemCapabilityInfo," as the state variable, contains the information on the processing capability of the DMR 205 in the form of hierarchical XML. The DMS 203 checks the processing capability of the DMR with reference the "SystemCapabilityInfo" variable.

Next, the CP 201 transmits the CM::PrepareForConnection( ) function to the DMS 203 and DMR 205 to inform or report the connection attempt (S311, S313). An argument of the PrepareForConnection( ) function includes a AVTransport InstanceID of the DMS and AVTransport InstanceID and Rendering Control InstanceID of the DMR 205.

If the Uniform Resource Identifier (URI) of the DMS 203 and DMR 205 is decided after the connection is established, the CP 201 executes AVT::SetAVTransportURI( ) according to AVTransport Service (Audio with Video Transport Service) (S315), and executes the AVT:Play( ) function (S317). The CP 201 then performs transmission control on specific content (i.e., starting or ending transmission of the content) (S319).

With the RenderingControlService of the DMR 205, it is possible to adjust the brightness, coloration, volume, etc. of the content transmitted to the DMR. Also, it is possible to control other content using the SetAVTransportURI( ) function. If the connection between DMS 203 and DMR 205 is no longer required, the ConnectionComplete( ) action of the ConnectionManager is executed to terminate the connection.

Figure 4:
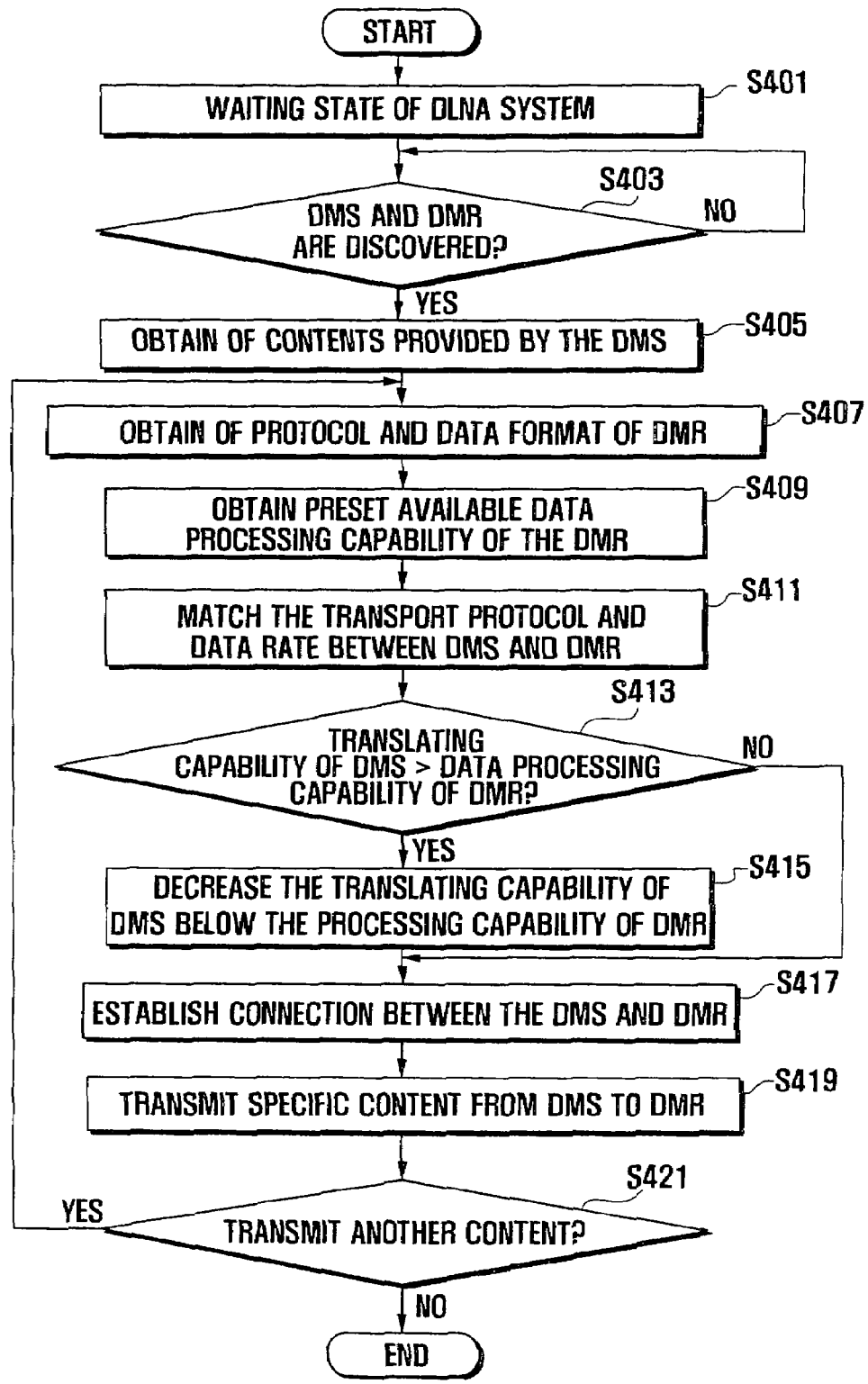
FIG. 4 is a flowchart illustrating a method for transforming information in the DLNA system according to an embodiment of the present invention.

FIG. 4 shows an exemplary method for transforming information in the DLNA system 200 according to an embodiment of the present invention.

Referring to FIG. 4, while the DLNA system 200 is in a waiting state (S401), the CP 201 discovers the DMS 203 and DMR 205 in the DLNA system using a discovery mechanism of UPnP technology of the DLNA system (S403). The waiting state continues until the DMS 203 and DMR 205 are found.

Once DMS 203 and DMR 205 are found, the CP 201 obtains the list of contents provided by the DMS by calling the DMS with the CDS::Browse/Search( ) function of ContentDirectService (S405). The contents list is displayed through the user interface so that user can select an item from the contents list.

The CP calls the DMR(s) 205 with the CM::GetProtocolInfo( ) function and allows the user to select a DMR. Once a DMR 205 is selected by the user, the CP 201 obtains the information on the protocol and the data format supported by the selected DMR (S407).

After obtaining the information on the protocol and data format of the DMR 205, the CP 201 executes the GetSystemCapabilityInfo( ) function of the Connection Manager service to obtain the information on the available data processing capability of the DMR (S409). The available data processing capability preferably includes the digital signal processing capability of the CPU, CPU value, memory value, GPU value, resolution, etc.

Next, the CP matches the transport protocol and the data information of the DMS 203 to those of the DMR 205 (S411).

The CP 201 informs the DMS 203 of the DMR's available processing capability. The DMS 203 uses the SetSystemCapability( ) function to decide on a transcoding scheme and a transrating scheme for the DMR 205 on the basis of the DMR's available processing capability (S413).

If the transcoding capability of the DMS 203 is greater than that of the DMR's presently available data processing capability, the MIU of the DMS adjusts the transrating of the DMS to be below, or within, the DMR's available data processing capability (S415).

After the adjustment of the transrating, the CP 201 attempts to connect the DMS 203 and the DMR 205 using the CM::PrepareForConnection( ) function (S417).

If the connection is established such that the Uniform Resource Identifier (URI) is decided for the DMS 203 and the DMR 205, the CP 201 executes the AVT::SetAVTransportURI( ) function in accordance with an Audio with Video Transport Service (AVTransport Service), resulting in data transmission at step S419.

After the completion of the data transmission, the CP 201 determines whether or not to transmit other content of the DMS (S421). If it is determined to transmit other content, the CP 201 returns to the step S405.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the data transforming method for the DLNA system of the present invention checks the presently available data processing capability of the DMP or DMR 205 before transmitting multimedia contents from the DMS 203 to the DMP or DMR and decides the transcoding and transrating schemes for the data. It is accordingly possible to secure assurance of a given QoS for multimedia content.

What is claimed is:

1. A data transforming method for universal plug and play (UPnP)-based digital living network association (DLNA) system:
   discovering a digital media server (DMS) and a digital media renderer (DMR) in the DLNA system;
   obtaining a list of contents provided by the DMS;
   obtaining information on transport protocol and data format of the DMR;

transmitting information on a present available data processing capability of the DMR to the DMS;

matching the transport protocol and the data format of the DMS to the transport protocol and the data formation of the DMR;

adjusting transcoding and transrating schemes of the DMS on the basis of the present available data processing capability of the DMR to be within or below the present available data processing capability of the DMR for each content to be transmitted;

establishing a connection between the DMS and the DMR; and transmitting content stored in the DMS to the DMR.

2. The method of claim 1, further comprising obtaining the available data processing capability by an action that retrieves information on a capability of at least one of said DMR and a Digital Media Player (DMP).

3. The method of claim 2, further comprising choosing a matching protocol and matching format based on the obtained available data processing capability, and setting, by the DMS, the chosen protocol and format.

4. The method of claim 2, wherein the available data processing capability is obtained by fetching a state variable that is stored in string format.

5. The method of claim 1, wherein the transcoding and transrating schemes are set by an action whose performance is optional in the DLNA system.

6. The method of claim 5, wherein the DMS sets said schemes by means of the action.

7. The method of claim 5, wherein said action is a function with a single argument which is an input argument whose data type is string.

8. The method of claim 5, wherein related to said argument is a state variable tat is optional in the DLNA system and whose data type is string.

9. The method of claim 8, wherein the state variable includes said available data processing capability of the DMR in an extensible markup language (XML).

10. The method of claim 9, wherein said available data processing capability of the DMR includes digital signal processing capability of the DMR, Central Processing Unit (CPU) value, memory value, Graphic Processing Unit (GPU) value, and resolution.

11. The method of claim 8, wherein the only allowed value of said state variable is string, and no default value is specified.

12. The method of claim 1, wherein the available data processing capability of DMR includes digital signal processing capability of the DMR, Central Processing Unit (CPU) value, memory value, Graphic Processing Unit (GPU) value, and resolution.

13. A data transforming method for home network which connects at least one server and at least two clients in wired or wireless links, comprising:

discovering the server and client;

obtaining a list of multimedia contents items provided by the server;

transmitting system information of a present client data processing capability to the server;

matching, for a client from among said clients, transport protocols and the data formats between the server and the client based on the obtained system information;

deciding transcoding and transrating schemes between the server and the client based on the transmitted present client data processing capability;

transforming the multimedia contents items in accordance with the transcoding and transrating schemes; and transmitting the transformed multimedia contents items from the server to the client; and adjusting the transrating between the server and client after checking present client data processing capability prior to transmission of each content.

14. The method of claim 13, wherein said obtained system information includes transport protocols and data formats supported by the client.

15. The method of claim 14, wherein said obtained system information includes an availability regarding a capability of the client.

16. The method of claim 15, wherein, the transcoding and transrating schemes are decided based on said availability obtained from the client.

17. The method of claim 16, wherein the transrating scheme has a transrating capability less than or equal to said availability obtained from the client.

18. The method of claim 13, wherein said discovering includes, when more than two clients are discovered, selecting a client from among said more than two clients.

19. The method of claim 13, wherein said transforming comprises:

determining whether or not there is an input command for selecting at least one of the multimedia contents items; and transcoding the selected multimedia contents items, if it is determined that there is the input command.

20. The method of claim 13, wherein said transmitting comprises:

determining whether or not there is an input command for selecting at least one of the multimedia contents items; and transmitting the selected multimedia items, if it is determined that there is the input command.

* * * * *